United States Patent
Eidson et al.

(10) Patent No.: US 6,856,656 B2
(45) Date of Patent: Feb. 15, 2005

(54) ITERATIVE CARRIER PHASE TRACKING DECODING SYSTEM

(75) Inventors: Donald Brian Eidson, San Diego, CA (US); Abraham Krieger, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 796 days.

(21) Appl. No.: 09/729,652

(22) Filed: Dec. 4, 2000

(65) Prior Publication Data

US 2002/0097814 A1 Jul. 25, 2002

(51) Int. Cl.[7] .............................................. H04L 27/22
(52) U.S. Cl. ...................................................... 375/326
(58) Field of Search ................................ 375/326, 324, 375/325, 327, 371, 372, 373

(56) References Cited

U.S. PATENT DOCUMENTS

| | | | | |
|---|---|---|---|---|
| 5,867,539 A | * | 2/1999 | Koslov ........................ | 375/346 |
| 5,933,462 A | * | 8/1999 | Viterbi et al. ................ | 375/341 |
| 6,023,783 A | | 2/2000 | Divsalar et al. ............. | 714/792 |
| 6,278,403 B1 | * | 8/2001 | Peng et al. .............. | 342/357.12 |

OTHER PUBLICATIONS

Bahl, L. R., et al., *Optimal Decoding of Linear Codes for Minimizing Symbol Error Rate*; IEEE Transactions on Information Theory, Mar. 1974, pp. 284–287.

Benedetto, S., et al., *A Soft–Input Soft–Output Maximum A Posteriori (MAP) Module to Decode Parallel and Serial Concatenated Codes*; TDA Progress Report, 42–127, Nov. 1996, pp. 1–20.

Benedetto, S. and Montorsi, G., *Iterative decoding of serially concatenated convolutional codes*; Electronics Letters, vol. 32, No. 13, Jun. 1996, pp. 1186–1188.

Benedetto, S. and Montorsi, G., *Serial concatenation of block and convolutional codes*; Electronics Letters, vol. 32, No. 10, May 1996, pp. 887–888.

Berrou, Claude, et al., *Near Shannon Limit Error—Correcting Coding and Decoding: Turbo–Codes (1)*; IEEE, 1993, pp. 1064–1070.

Divsalar, D. and Pollara, F., *Serial and Hybrid Concatenated Codes with Applications*; Jet Propulsion Laboratory, California Institute of Technology, pp. 1–8.

Divsalar, D. and Pollara, F., *Turbo Trellis Coded Modulation with Iterative Decoding for Mobile Satellite Communications*; Jet Propulsion Laboratory, California Institute of Technology, pp. 1–7.

Hagenauer, Joachim and Hoeher, P., *A Viterbi Algorithm with Soft–Decision Outputs and its Applications*; Proceedings of IEEE Globecom '89; Dallas, Texas, Nov. 1989; pp. 47.1.1—49.1.7.

(List continued on next page.)

*Primary Examiner*—Chieh M. Fan
*Assistant Examiner*—Kevin Kim
(74) *Attorney, Agent, or Firm*—Howrey Simon Arnold & White, LLP

(57) ABSTRACT

An iterative system for performing carrier phase tracking of symbols using a serial turbo decoder. Estimates of a buffered block of symbols are provided by a serial turbo decoder. Optionally, reliability metrics for the estimates are provided as well. Responsive to this information, a tracking loop module determines derotation phases for each of the symbols in the buffer. A symbol derotator derotates each of the buffered symbols in the block by its corresponding derotation phase. The derotated symbols are stored back in the buffer. The process may repeat itself for a prescribed number of iterations, after which the serial turbo decoder provides estimates of the underlying source bits.

39 Claims, 4 Drawing Sheets

OTHER PUBLICATIONS

Hoeher, Peter and Lodge, John, *"Turbo DPSK": Iterative Differential PSK Demodulation and Channel Decoding*; IEEE Transactions on Communications, vol. 47, No. 6, Jun. 1999, pp. 837–843.

Narayanan, Krishna R. and Stüber, Gordon L., *A Serial Concatenation Approach to Iterative Demodulation and Decoding*; IEE Transactions on Communications, vol. 47, No. 7, Jul. 1999, pp. 956–961.

Robertson, P., et al., *A Comparison of Optimal and SubOptimal MAP Decoding Algorithms Operating in the Log Domain*; IEEE, 1995, pp. 1009–1013.

Viterbi, Andrew J., *An Intuitive Justification and a Simplified Implementation of the MAP Decoder for Convolutional Codes*; IEEE Journal on Selected Areas in Communications, vol. 16, No. 2, Feb. 1998, pp. 260–264.

* cited by examiner

ITERATIVE CARRIER PHASE TRACKING DECODING SYSTEM

RELATED APPLICATIONS

This application is related to (1) "SYSTEM FOR PERFORMING CARRIER PHASE TRACKING OF CHANNEL SYMBOLS USING RELIABILITY METRICS IN THE TRACKING LOOP," U.S. patent application Ser. No. 09/715,877, filed Nov. 17, 2000; and (2) "RATE N/N SYSTEMATIC, RECURSIVE CONVOLUTIONAL ENCODER AND CORRESPONDING DECODER," U.S. patent application Ser. No. 09/602,690, filed Jun. 23, 2000, both of which are owned in common by the assignee hereof, and both of which are hereby fully incorporated by reference herein as though set forth in full.

BACKGROUND OF THE INVENTION

1. Field of the Invention

This invention generally relates to carrier phase tracking, and, more specifically, to an iterative carrier phase tracking decoding system using a serial turbo decoder.

2. Related Art

The carrier phase of a signal can meander with time, due to instabilities in the transmitter upconversion circuitry, or instabilities in the demodulator oscillator and downconversion circuitry. The presence of this phase noise degrades the performance of a receiver, by creating a phase rotation in the actual signaling constellation with respect to the assumed signaling constellation. Since the phase noise typically varies at a much slower rate than the transmitted symbol rate, this phase noise trend can often be estimated (e.g. "tracked"), and subsequently compensated for by circuits within the receiver. However, at low SNRs (i.e., $E_s/N_o$ values), such as those at which turbo decoders operate, this phase noise can be difficult to accurately track and compensate for, because the phase trend is difficult to distinguish from the noise. For example, at low $E_s/N_0$ values, uncoded 8-PSK symbol error rates of 20–30% have been experienced. At such high error rates, decision-oriented phase tracking loops within a conventional demodulator can experience great difficulty in following phase trends. Since phase tracking is imperfect, the result is a higher than desired bit error rate (BER). Even if the phase trend can be tracked, current phase tracking loops may only be sufficient to prevent cycle slippage of the signal constellation. A significant amount of phase error may still be present in the received symbols.

SUMMARY

This invention provides an iterative carrier phase tracking system employing a turbo decoder of serially concatenated codes (hereinafter referred to as "serial turbo decoder"). The system employs a tracking loop comprising the series combination of a serial turbo decoder, a tracking loop module, and a derotator. Prior to a particular iteration of the system, a block of symbols is stored in a buffer. The output of the buffer is input to the serial turbo decoder. For one or more symbols in the block, the serial turbo decoder forms an estimate of the symbols, and, optionally, a reliability metric for the estimate. The estimates (and reliability metrics if produced) for the one or more buffered symbols are input to the tracking loop module. Responsive thereto, the tracking loop module determines a residual between one or more of the buffered symbols and its corresponding estimate. If reliability metrics are produced, the tracking loop module may weight one or more of the residuals by its corresponding reliability metric. The tracking loop module then determines a derotation phase for one or more of the symbols in the block responsive to one or more of the weighted or unweighted residuals for the block. Derotation phases for one or more of the symbols in the block are input to the symbol derotator. The symbol derotator derotates one or more of the symbols in the block by its corresponding deterioration phase. To ensure proper synchronization, a first delay element may be provided between the output of the buffer and the symbol derotator, and second delay element may be provided between the output of the buffer and the tracking loop module. The first delay element compensates for any delay through the serial turbo decoder and the tracking loop module, and the second delay element compensates for any delay through the serial turbo decoder. One or more of the derotated symbols output from the symbol derotator and then stored back in the buffer, replace the previously buffered symbols, and become the buffered symbols for the next iteration. At this point, another iteration may commence. After a prescribed number of iterations, estimates of the underlying source bits are output by the serial turbo decoder.

In one example, a weighed windowing technique may be used in which, during a particular iteration p, the derotation phase for the ith symbol in the block, $\theta_i^p$, is derived from a plurality of residuals which are within a sliding window. The residuals may be any values derived from a comparison of the symbols with their corresponding estimates, including, without limitation, phase residuals, or residuals comprising the components of the symbols which are orthogonal to the corresponding symbol estimates. The window may extend on either side of the symbol because of the non-casual nature of the technique. In one example, the calculation of $\theta_1^p$ during a particular iteration p may be expressed through the following equation:

$$\theta_i^p = \sum_{j=i-W/2}^{j=i+W/2} z_j^p \cdot w_j$$

where W is the size of the window, in terms of number of symbols, $z_j^p$ is a residual determined during iteration p between a buffered symbol $r_j^p$ and the corresponding estimate of that symbol $s_j^p$; and $w_j$ is the weight assigned to the jth residual $z_j^p$. The weights $w_j$ may follow a predefined phase-noise filter mask. Also, as stated above, the residual $z_j^p$ may be, without limitation, the phase residual $e_j^p$ between $r_j^p$, the jth buffered symbol, and $s_j^p$, the estimate of that symbol; or the orthogonal component residual $y_j^p$, which is the component of $r_j^p$ which is orthogonal to $s_j^p$.

In another example, the reliability metrics may also used to compute the derotation phases in accordance with the following expression:

$$\theta_i^p = \frac{\sum_{j=i-W/2}^{j=i+W/2} z_j^p \cdot w_j \cdot R_j^p}{\sum_{j=i-W/2}^{j=i+W/2} w_j \cdot R_j^p}$$

In the foregoing, the parameters $\theta_j^p$, $z_j^p$, and $w_j$ are a s defined previously. The parameter $R_j^p$ is the reliability metric for the jth symbol estimate determined during iteration p.

In a third example, a technique may be employed in which the derotation phases are computed in accordance with the following equation:

$$\theta_k^p = \sum_{i=1}^{N} a_i \cdot \theta_{k-i}^p + \sum_{i=0}^{M-1} b_i \cdot R_{k-i}^p \cdot z_{k-i}^p$$

In this expression, $\theta_k^p$ is the derotation phase for the kth symbol determined during the pth iteration, $\theta_{k-i}^p$ represents the derotation phase for the (k−i)th symbol during the pth iteration, $a_i$ is a coefficient applied to $\theta_{k-i}^p$, $z_{k-i}^p$ is a residual derived during the pth iteration from a comparison of the (k−i)th symbol, $r_{k-i}^p$, with the estimate for that symbol, $s_{k-i}^p$, $R_{k-i}^p$ is the reliability metric for the estimate of the (k−i)th symbol during the pth iteration, $b_i$ is a coefficient applied to $R_{k-i}^p \cdot z_{k-i}^p$, and N and M are non-negative integers.

Other systems, methods, features and advantages of the invention will be or will become apparent to one with skill in the art upon examination of the following figures and detailed description. It is intended that all such additional systems, methods, features and advantages be included within this description, be within the scope of the invention and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

A. Embodiments of the Invention

Figure 1:
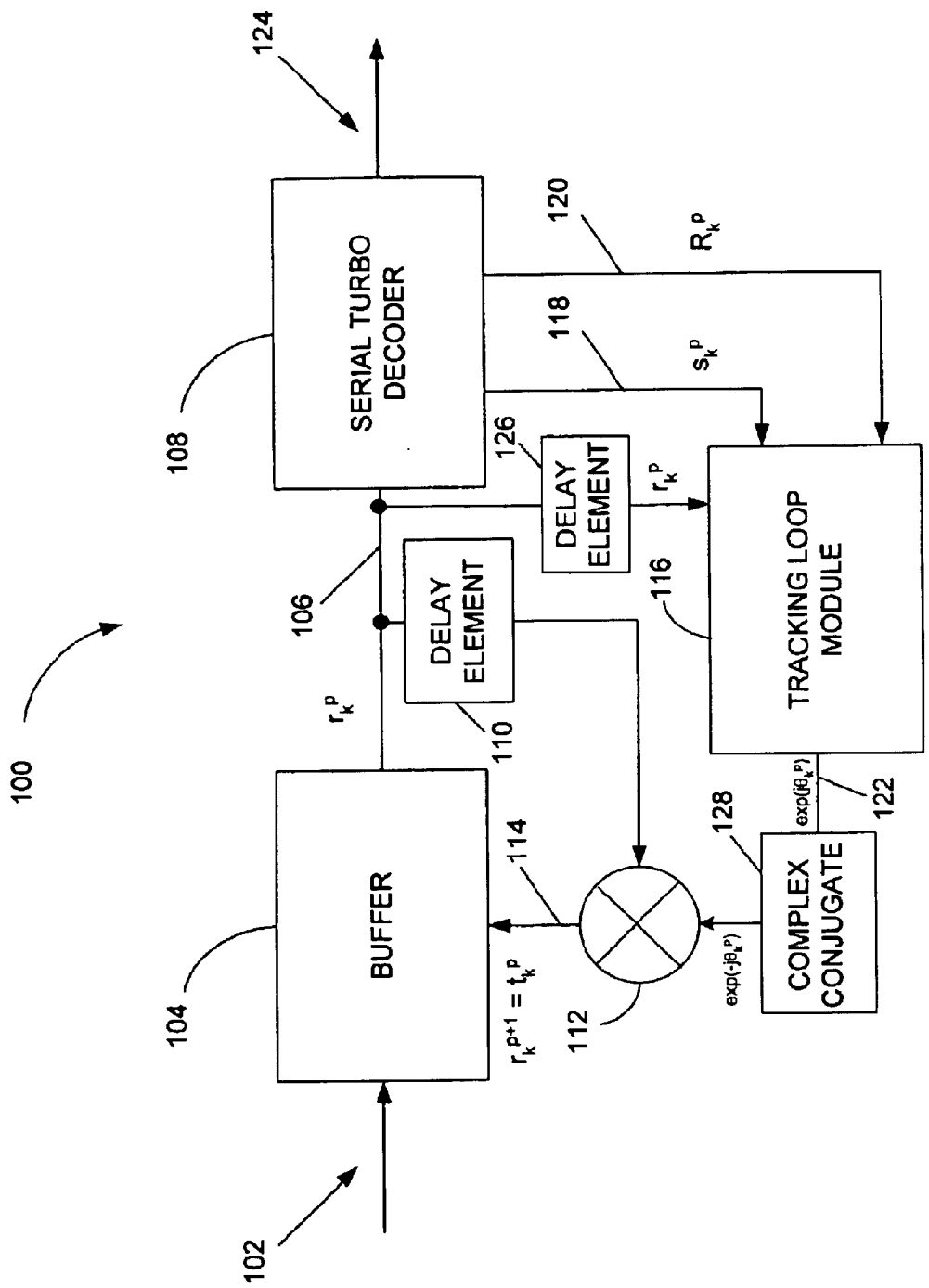
FIG. 1 is a block diagram of an iterative carrier phase tracking decoding system in accordance with the subject invention.

An embodiment of an iterative carrier phase tracking decoding system 100 in accordance with the subject invention is illustrated in FIG. 1. This embodiment employs a tracking loop comprising the series combination of serial turbo decoder 108, tracking loop module 116, and symbol derotator 112. The system is configured to buffer a block of symbols, and then iteratively derotate the block of symbols to reduce or eliminate phase error with the carrier. In addition, the system is configured to iteratively decode the symbols into their underlying source bits. A controller (not shown) may be provided to direct the system through its multiple iterations. In one application, the system may function as the decoder 108 in the system of FIG. 1 of Ser. No. 09/715,877, previously incorporated by reference. In this application, the decoder reduces or eliminates carrier phase error in the symbols over and above that removed by the carrier tracking module 106 in FIG. 1 of Ser. No. 09/715,877. It should be appreciated, however, that other applications of the system are possible. For example, an application is possible where carrier tracking module 106 is eliminated in the system of FIG. 1 of Ser. No. 09/715,877, and the system 100 is coupled to demodulator 104. In this application, the system could be the sole means for reducing or eliminating carrier phase error in the received symbols.

The system is initialized when a block of L symbols is stored in buffer 104, where L is an integer greater than or equal to 1, over one or more signal lines 102. These symbols may originate from carrier tracking module 106 in FIG. 1 of Ser. No. 09/715,877 or from some other source. The symbols may be encoded with a serial concatenated convolutional coder (SCCC) or serial concatenated trellis coded modulation coder (SCTCM) such as that described or referred to in "Serially Concatenated Trellis Coded Modulation with Iterative Decoding: Design and Performance," by S. Benedetto, D. Divsalar, G. Montorsi, and F. Pollara, in IEEE Communications Theory Mini Conference associated with Globecom '97, pp. 38–43, 1997, which is hereby fully incorporated by reference herein as though set forth in full.

The output of the buffer comprises a block of L symbols which can be referred to using the notation $r_k^p$, where the subscript k, $1 \leq k \leq L$, refers to the position of a particular symbol in the block, and the superscript p refers to the pth iteration. If the pth iteration is the first iteration of the system, as discussed, the output of the buffer will be the initially stored block of symbols received over the one or more signal lines 102. If the pth iteration of the system is not the first iteration of the system, the output of the buffer will be the derotated block of symbols stored in the buffer during the previous iteration over one or more signal lines 114.

During a particular iteration p, the buffered block of symbols, whatever their source, is then provided over one or more signal lines 106 to serial turbo decoder 108. Responsive thereto, serial turbo decoder 108 provides, on one or more signal lines 118, a block of estimates $s_k^p$, $1 \leq k \leq L$, such that an estimate is provided for each of the symbols in the block. In addition, serial decoder 108 may optionally provide, over one or more signal lines 120, a block of reliability metrics $R_k^p$, $1 \leq k \leq L$, such that a reliability metric is provided for each of the symbol estimates. The symbol estimates $s_k^p$, and optionally the reliability metrics $R_k^p$, are input to tracking loop module 116. In addition, the buffered symbols $r_k^p$ are input to the tracking loop module 116 after passage through delay element 126. Delay element 126 is configured to compensate for any delay through serial turbo decoder 108, and allow proper synchronization between all the inputs to tracking loop module 116.

Responsive to this information, tracking loop module 116 computes, for each symbol $r_k^p$, a residual $z_k^p$ between a buffered symbol $r_k^p$ and the estimate $s_k^p$ of that symbol. If reliability metrics $R_k^p$ are produced, the tracking loop module 116 may weight one or more of the residuals $z_k^p$ with the reliability metric $R_k^p$ for the corresponding estimate $s_k^p$. Responsive to one or more of the weighted or unweighted residuals, the tracking loop module will determine a complex exponential based on the derotation phase, $\exp(-j\theta_k^p)$, for each of the symbols in the block. These complex exponentials are input to complex conjugate block 128, which determines the complex conjugates $\exp(-j\theta_k^p)$ of the complex exponentials. These complex conjugates are input to symbol derotator 112 over one or more signal lines 122. Symbol rotator 112 derotates each symbol in the block by its corresponding derotation phase. In one implementation, where the symbols are embodied as a quadrature baseband signal, the symbol derotator is a modulator, which is configured to multiply the baseband signal by the complex conjugates $\exp(-j\theta_k^p)$.

To ensure proper synchronization, delay element 110 is provided between the output of buffer 104 and derotator 112. This delay element compensates for delay through serial turbo decoder 108 and tracking loop module 116. After derotating the symbols in the block, derotator 112 stores the resulting derotated symbols $t_k^p$ back in buffer 104. These derotated symbols $t_k^p$ replace the previously buffered symbols $r_k^P$, and become the buffered symbols $r_k^{P+1}$ for use in the next iteration. This completes the pth iteration of the system. The foregoing process may then repeat for additional iterations until, e.g., a prescribed number of iterations has been completed. After this has been accomplished, serial turbo decoder 108 provides estimates of the underlying source bits over signal line 124.

In one example, a weighted windowing technique may be employed to determine the derotation phases. According to this technique, the derotation phase $\theta_i^P$ for the ith buffered symbol in the block, $r_k^P$, $1 \leq k \leq L$, during the pth iteration may be derived from residuals $z_k^P$ within a sliding window which may extend to positions on either side of the symbol in question because of the non-causal nature of the technique. In one example, the calculation of $\theta_i^P$, $1 \leq i \leq L$, may be expressed as follows:

$$\theta_i^P = \sum_{j=i-W/2}^{j=i+W/2} z_j^P \cdot w_j \qquad (1)$$

where W+1 is the size of the window, in terms of number of symbols; $z_j^P$, $1 \leq j \leq L$, is a residual between a buffered symbol $r_j^P$, $1 \leq j \leq L$, and the corresponding estimate of that symbol $s_j^P$, $1 \leq j \leq L$; and $w_j$ is the (filter) weight assigned to the jth residual $z_j^P$. The weights $w_j$ may, in some instances, follow a time domain representation of a predefined phase-noise mask. These weights are assumed normalized, such that $$\sum_{j=i-W/2}^{j=i+W/2} w_j = 1.$$

Depending on the application, the residual $z_j$ may be without limitation a phase residual, $e_j^P$, $1 \leq k \leq L$, between $r_j^P$, $1 \leq k \leq L$, and $s_j^P$, $1 \leq k \leq L$; or an orthogonal component residual $y_j^P$, i.e., the component of $r_j^P$ orthogonal to $s_j^P$. Other examples are possible. These concepts are explained in detail in Ser. No. 09/715,877, previously incorporated by reference.

In another example, reliability information $R_k^P$, $1 \leq k \leq L$, for the symbol estimates $s_k^P$, $1 \leq k \leq L$, may also be used to determine the derotation phases. In accordance with this technique, the derotation phase $\theta_i^P$, $1 \leq i \leq L$, may be expressed as:

$$\theta_i^P = \frac{\sum_{j=i-W/2}^{j=i+W/2} z_j^P \cdot w_j \cdot R_j^P}{\sum_{j=i-W/2}^{j=i+W/2} w_j \cdot R_j^P} \qquad (2)$$

In the foregoing, the parameters $\theta_i^P$, $z_j^P$, and $w_j$ are as defined previously. The parameter $R_j^P$, $1 \leq j \leq L$, is the reliability metric of the jth symbol estimate during the pth iteration.

In one implementation, only a subblock of the $r_k^P$ (from which the $z_k^P$) are formed) during a particular iteration need be kept in active storage. Once $\theta_k^P$ is computed, it may be used to derotate the corresponding $r_k^P$, and thus update the value to be processed in the next iteration. Thus updated datum is denoted by $r_k^{P+1}$.

In a third example, a technique may be employed where the derotation phase for the kth symbol in the block, $\theta_k^P$, may be computed in accordance with the following equation:

$$\theta_k^P = \sum_{i=1}^{N} a_i \cdot \theta_{k-i}^P + \sum_{i=0}^{M-1} b_i \cdot R_{k-i}^P \cdot z_{k-i}^P \qquad (3)$$

In this expression, $\theta_k^P$ is the derotation phase for the kth symbol in the block, $1 \leq k \leq L$, during the pth iteration, $\theta_{k-i}^P$ represents the derotation phase for the (k–i)th symbol, during the pth iteration, $a_i$ is a coefficient applied to $\theta_{k-i}^P$, $z_{k-i}^P$ is a residual derived from a comparison of the (k–i)th buffered symbol, $r_{k-i}^P$, with an estimate of that symbol, $s_{k-i}^P$, $R_{k-i}^P$ is the reliability metric for the estimate of the (k–i)th symbol during the pth iteration, $b_1$ is a coefficient applied to $R_{k-i}^P \cdot z_{k-i}^P$, and M and N are non-negative integers. Again, depending on the application, the residual $z_{k-i}^P$ may be a phase residual, $e_{k-i}^P$ or an orthogonal component residual $y_{k-i}^P$, i.e., the component of $r_{k-i}^P$ orthogonal to $s_{k-i}^P$.

Examples of this technique are described in Ser. No. 09/715,877. In one such example, the tracking loop has a loop bandwidth which may vary from symbol to symbol responsive to $R_k^P \cdot z_k^P$, where $R_k^P$ is the reliability metric for the estimate of the kth symbol during the pth iteration, and $z_k^P$ is the residual corresponding to the kth symbol during the pth iteration. In one implementation, the loop may be implemented as a digital filter or digital loop with modifiable loop parameters.

Figure 2:
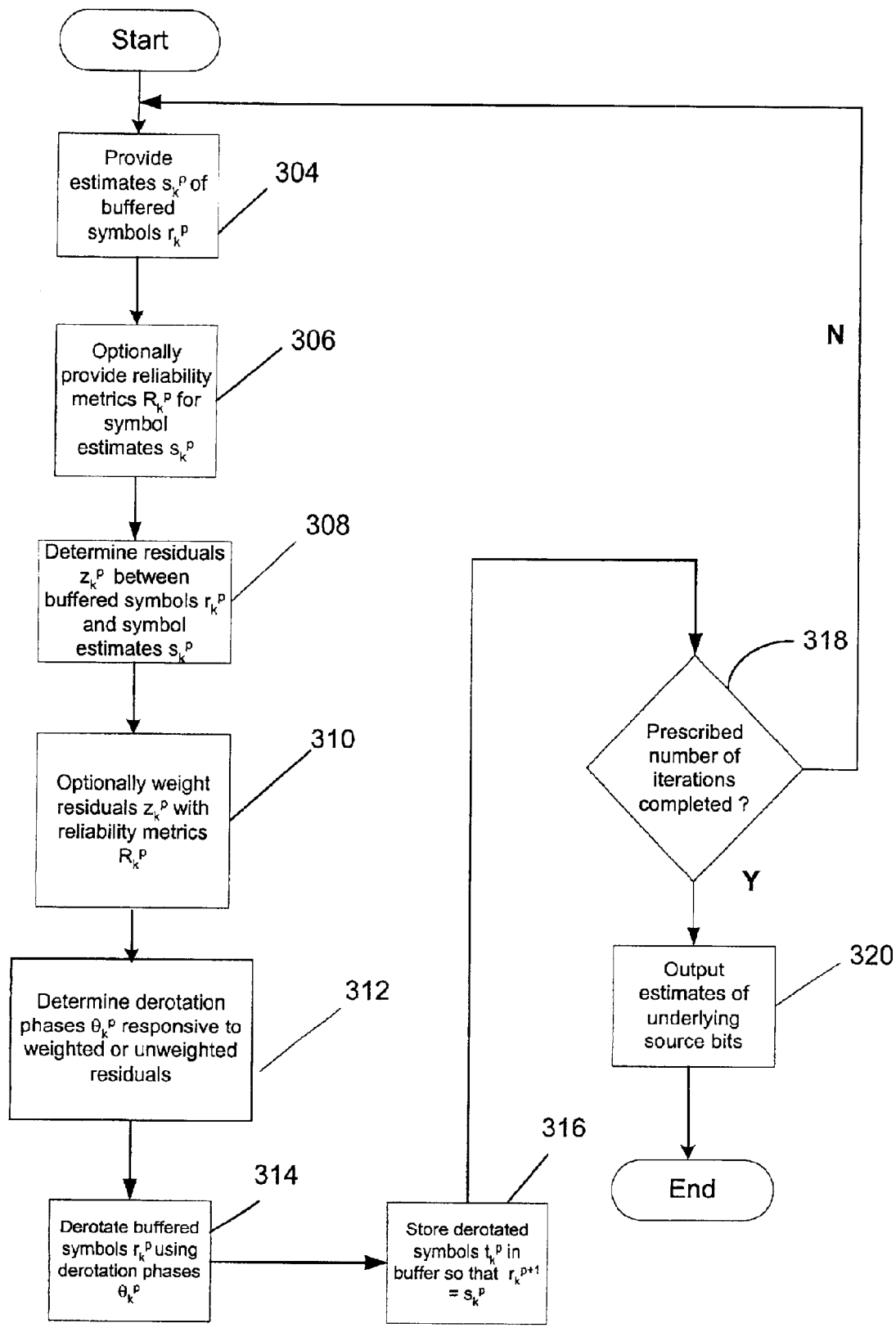
FIG. 2 is a flowchart of a method of operation of the system of FIG. 1.

A flowchart of a method of operation of the system of FIG. 1 is illustrated in FIG. 2. The method begins with step 304, in which estimates $s_k^P$, $1 \leq k \leq L$, of a block of buffered symbols $r_k^P$, $1 \leq k \leq L$, are provided. This step may be performed by a serial turbo decoder. Step 304 is followed by step 306, in which reliability metrics $R_k^P$, $1 \leq k \leq L$, for the symbol estimates $s_k^P$, $1 \leq k \leq L$, are optionally provided. Again, this step may be performed by a serial turbo decoder.

Step 306 is followed by step 308, in which residuals $z_k^P$, $1 \leq k \leq L$, between the buffered symbols $r_k^P$, $1 \leq k \leq L$, and the symbol estimates $s_k^P$, $1 \leq k \leq L$, are provided. These residuals may be without limitation phase residuals $e_k^P$, $1 \leq k \leq L$, or orthogonal component residuals, $y_k^P$, $1 \leq k \leq L$, that is, the components of the buffered symbols $r_k^P$, $1 \leq k \leq L$, orthogonal to the corresponding symbol estimates $s_k^P$, $1 \leq k \leq L$.

Step 308 is followed by step 310, in which the residuals $z_k^P$, $1 \leq k \leq L$, are optionally weighted by the corresponding reliability metrics, $R_k^P$, $1 \leq k \leq L$.

Step 310 is followed by step 312, in which the derotation phases $\theta_k^P$, $1 \leq k \leq L$, are determined responsive to one or more of the weighted or unweighted residuals, and possibly other parameters such as one or more previous values of the derotation phases. Examples of this step are represented by any of the equations (1), (2), or (3) presented earlier.

Step 312 is followed by step 314, in which the buffered symbols $r_k^P$, $1 \leq k \leq L$ are derotated by their corresponding derotation phases $\theta_k^P$, $1 \leq k \leq L$. Step 314 is followed by step 316, in which the derotated symbols $t_k^P$, $1 \leq k \leq L$, are stored back in the buffer, replacing the symbols $r_k^P$, $1 \leq k \leq L$, and becoming the symbols $r_k^{P+1}$, $1 \leq k \leq L$ for use in the next iteration. Step 316 is followed by step 318 in which a query is made whether the prescribed number of iterations of the system has been completed. If the answer is no, a jump is made back to step 304 to begin the next iteration. If the answer is yes, the process proceeds to step 320, where estimates of the underlying source bits are provided. Again, this step may be performed by a serial turbo decoder. The process then completes.

B. Serial Turbo Decoders

Figure 3:
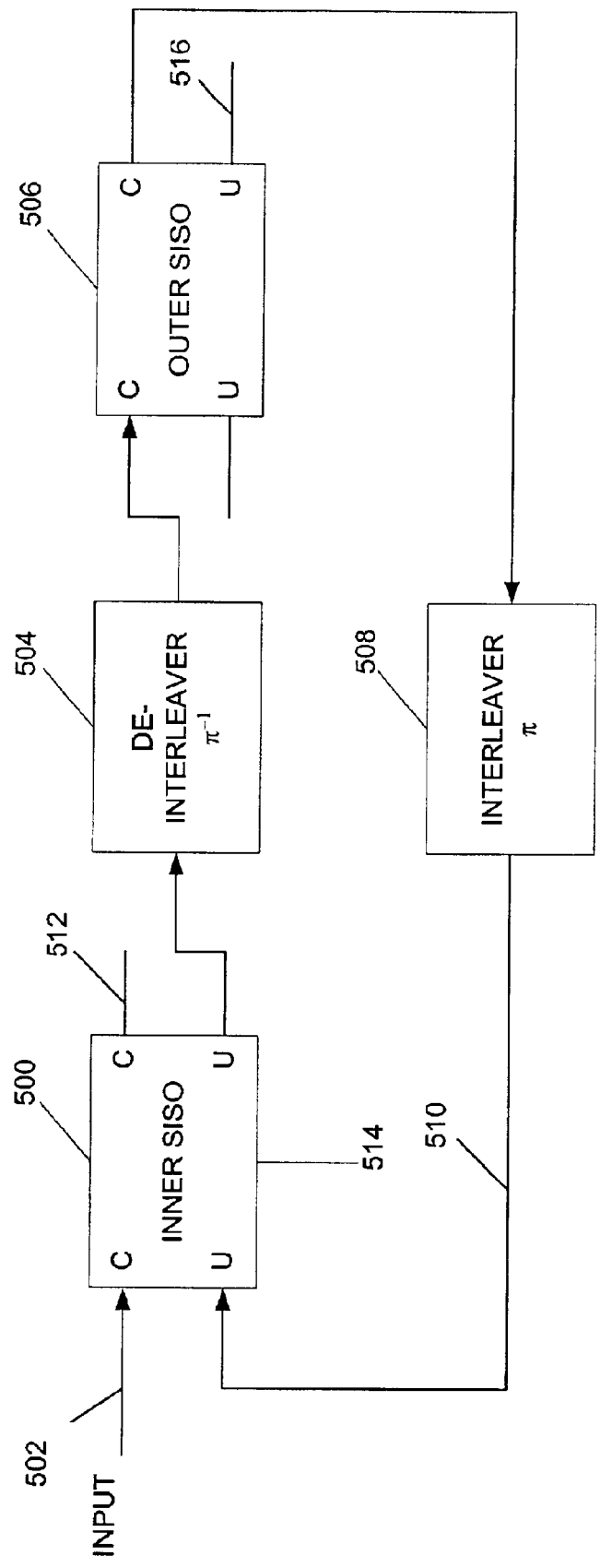
FIG. 3 is a block diagram of a serial turbo decoder.

A block diagram of one embodiment of a serial turbo decoder is illustrated in FIG. 3. As illustrated, two instances of a four port device known as a soft input soft output (SISO) module are employed in the decoder. The first such module is inner SISO 500, and the second such module is outer SISO 506.

Each such module may have two inputs, a coded (C) symbol input, and an uncoded (U) bit input, and two outputs, a coded (C) symbol output, and an uncoded (U) bit output. The coded symbols to be decoded are input over one or more signal lines 502 to the C input of inner SISO 500. One or more signal lines 502 corresponds to one or more signal lines 106 in FIG. 1, and one or more signal lines 206 in FIG. 2. A priori information from interleaver 508 is provided over one or more signal lines 510 to the U input of inner SISO 500. The inner SISO 500 employs a soft output algorithm, such as a MAP (Maximum A Posteriori) algorithm, or an algorithm providing similar functionality, such as a log-MAP algorithm, or a SOVA (Soft Output Viterbi Algorithm) to determine estimates of each coded symbol and the underlying source bits. From these estimates, the inner SISO produces extrinsic information regarding the source bits and a posteriori estimates of the coded symbols. It provides a posteriori estimates of the coded symbols on its C output (one or more signal lines 118 in FIG. 1; one or more signal lines 218 in FIG. 2). It outputs the extrinsic information regarding the uncoded source bits on its U output. Inner SISO 500 may also output, on one or more signal lines 514, reliability metrics for each of the symbol estimates. One or more signal lines 514 corresponds to one or more signal lines 120 in FIG. 1, and one or more signal lines 220 in FIG. 2.

The information output on the U output of inner SISO 500 is passed through de-interleaver 504, and then input to the C input of outer SISO 506. The information output on the C output of inner SISO 500 is output on one or more signal lines 512. In the example shown, the U input of outer SISO 506 is not used.

The outer SISO 506 also employs a soft output estimation procedure (such as MAP, log-MAP, SOVA, or a functional equivalent) to compute a posteriori estimates of the coded symbols. The a posteriori estimates of the coded symbols are output on the C output of the outer SISO 506. The a posteriori estimates output on the C output of outer SISO 506 are passed through interleaver 508, and then provided, over one or more signal lines 510, to the U input of inner SISO 500. This information acts as a priori information to the inner SISO 500.

After a prescribed number of iterations, outer SISO 506 provides, over one or more signal lines 516, estimates of the source bits, again using a soft output procedure (such as MAP, log-MAP, SOVA, or a functional equivalent). Prior to this time, in the example shown, the U output of outer SISO 506 is not typically used or computed.

Figure 4:
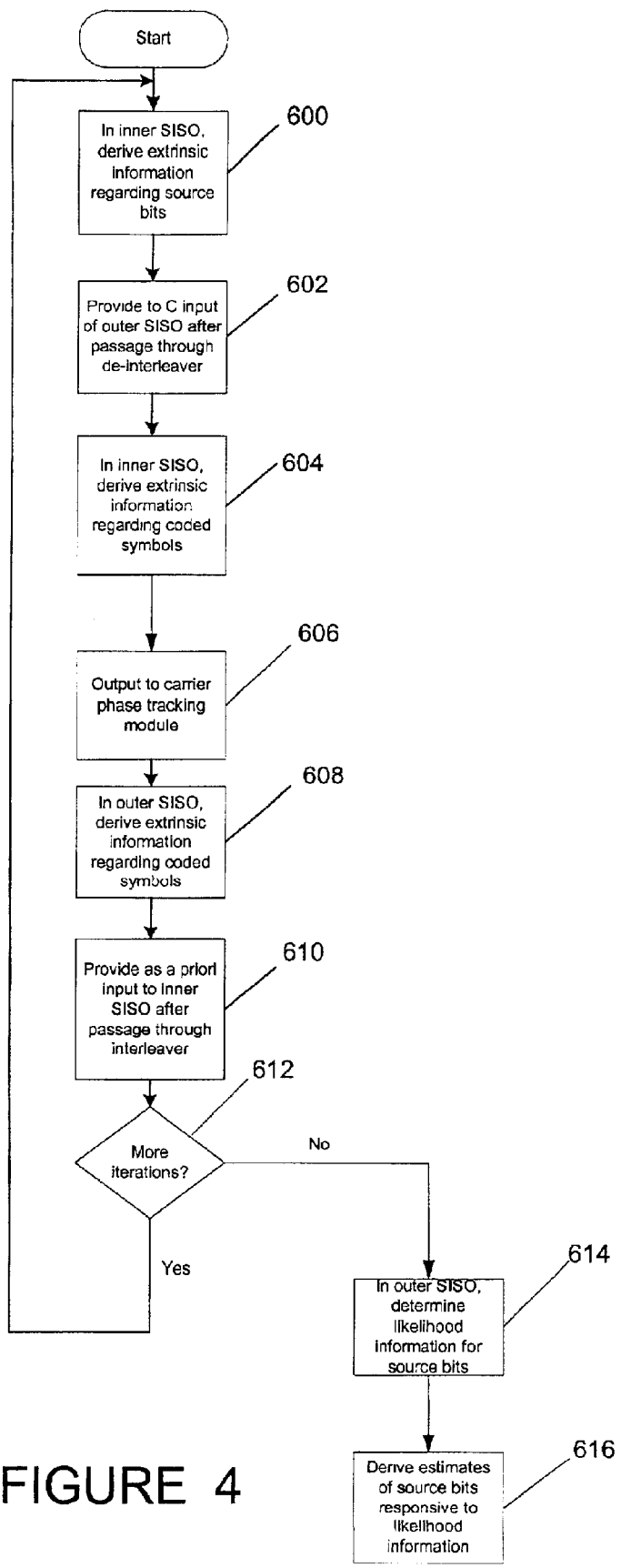
FIG. 4 is a flowchart of a method of operation of the serial turbo decoder of FIG. 3.

FIG. 4 illustrates an embodiment of a process employed by the decoder of FIG. 3. In step 600, within the inner SISO 500, extrinsic information relating to uncoded source bits is derived. This step may include estimating the source bits, and then subtracting the a priori information regarding the source bits provided at the U Step 600 is followed by step 602. In step 602, the extrinsic information derived in the previous step is provided as a priori information to the C input of outer SISO 506 after passage through de-interleaver 504.

Step 602 is followed by step 604 where, in the inner SISO 500, extrinsic information relating to estimates of the coded symbols is derived. This step may include estimating the coded symbols, and then subtracting the a priori information provided to the U input of inner SISO 500. This step may also include deriving likelihood information regarding the symbol estimates.

Step 604 is followed by step 606, where the extrinsic information relating to the symbol estimates is output over one or more signal lines 512. This step may also include outputting the reliability metrics for the symbol estimates over one or more signal lines 514.

Step 606 is followed by step 608, where, in the outer SISO 506, extrinsic information regarding the coded channel symbols is derived. This step may include estimating the channel symbols and then subtracting the a priori information regarding channel symbols provided to the C input of outer SISO 506.

Step 608 is followed by step 610, where the extrinsic information regarding coded channel symbols derived in the previous step is provided as a priori information to the U input of inner SISO 500 after passage through interleaver 508.

Step 610 is followed by decision block 612. In decision block 612, it is determined whether additional iterations should be performed. If so, the process is repeated, beginning with step 600. If not, a jump is made to step 614. In step 614, in the outer SISO 506, likelihood information is derived for the underlying source bits. Step 614 is followed by step 616, where estimates of the underlying source bits are derived from the likelihood information.

For more information regarding soft output estimation processes, such as MAP, log-MAP, SOVA, and the like, the reader is referred to "Optimal Decoding of Linear Codes for Minimizing Symbols Error Rate," L. R. Bahl et al., IEEE Transactions on Information Theory, March 1974, pp. 27–30 (hereinafter referred to as "the Bahl reference"); "Near Shannon Limit Error-Correcting Coding and Decoding: Turbo Codes, " C. Berrou et al., Proc. ICC '93 Geneva, Switzerland, May 1993, pp. 1064–1070 (hereinafter referred to as "the Berrou reference"); "An Intuitive Justification and Simplified Implementation of the MAP Decoder for Convolutional Codes," A. Viterbi, IEEE Journal On Selected Areas In Telecommunications. Vol. 16 No. 2, February 1998, pp. 260–264 (hereinafter referred to as "the Viterbi reference"); and "A Viterbi Algorithm with Soft-Decision Outputs and its Applications" J. Haganauer and P. Hoeher, in Proceedings of IEEE Globecom '89, Dallas, Tex., November 1989, pp. 47.1.1–47.1.7 (hereinafter referred to as "the Hagenauer reference"). Each of the Bahl, Berrou, Viterbi, and Hagenauer references is hereby fully incorporated by reference herein as though set forth in full.

C. Additional Embodiments

From the previous section, it can be seen that the serial turbo decoder 108 in the system of FIG. 1 is iterative, as is the system itself. Embodiments of the system of FIG. 1 is possible where the iterations of the serial turbo decoder occur in tandem with those of the overall system. Thus, in the system of FIG. 1, serial turbo decoder 108 may perform an iteration for each iteration of the overall system. However, it should be appreciated that a tight coupling between the two may not be necessary, and embodiments are possible where the serial turbo decoder iterates many times for each iteration of the overall system. Thus, in the system of FIG. 1, serial turbo decoder 108 may perform several iterations for each iteration of the overall system.

Embodiments are also possible where the buffered symbols $r_k^p$, $1 \leq k \leq L$, are derotated for each iteration of the system, or, alternatively, are derotated only for selected iterations of the system. As an example of the latter, recognizing that the estimates of the symbols may become more reliable at the iterations of the system progress, the buffered symbols may be derotated only after a prescribed number of iterations of the system have taken place. On the other hand, recognizing that the carrier phase error may be highest during the initial iterations of the system, the buffered symbols may be derotated only during the initial iterations of the system.

Furthermore, embodiments are possible where iterations of the serial turbo decoder and the overall system occur in tandem, but the symbols estimates and optionally reliability metrics from the turbo decoder are available before the iteration of the decoder is completed. Consider, for example, embodiments where the serial turbo decoder of FIG. 3 serves as decoder 108 in the system of FIG. 1. The symbol estimates $s_k^P$, $1 \leq k \leq L$, and, optionally, the reliablity metrics $R_k^P$, $1 \leq k \leq L$, may be provided by the inner SISO well before the iteration of the serial turbo decoder has been completed (this typically occurs when the interleaver has provided a priori information to the U input of the inner SISO). This is advantageous, because it allows the tracking loop module to begin processing this information in parallel with the operation of the serial turbo decoder.

Of course, embodiments are also possible where the symbol estimates and optional reliability metrics are derived from an output of the outer SISO rather than the inner SISO. With reference to FIG. 3, for example, an embodiment is possible in which the symbol estimates are derived from the output 510 of interleaver 508. In this embodiment, the output 510 of interleaver may be adjusted by first adding back the a priori information provided initially to the C input of outer SISO 506. Hard decisions may be made based on the bits, and this information may then passed through an inner encoder and symbol mapper which corresponds to inner SISO 500. The result of this process is symbol estimates which may be output to the tracking loop module.

While various embodiments of the invention have been described, it will be apparent to those of ordinary skill in the art that many more embodiments and implementations are possible that are within the scope of this invention. Accordingly, the invention is not to be restricted. Accordingly, the invention is not to be restricted except in light of the attached claims and their equivalents.

What is claimed is:

1. An iterative carrier phase tracking decoding system comprising:
 a buffer for buffering a block of symbols;
 a serial turbo decoder for providing, during an iteration p, estimates $s_k^P$ of one or more of the buffered symbols, $r_k^P$, and having a capability to provide one or more reliability metrics $R_k^P$, for the one or more estimates, and, after a prescribed number of iterations, estimates of underlying source bits;
 a tracking loop module configured, during an iteration p, to (a) determine one or more residuals $z_k^P$, between the one or more buffered symbols, $r_k^P$, and the corresponding one or more symbol estimates, $s_k^P$; (b) weight the residuals with corresponding reliability metrics, $R_k^P$; and (c) determine one or more derotation phases $\theta_k^P$ responsive to one or more of the weighted or unweighted residuals;
 a symbol derotator for derotating, during an iteration p, one or more of the buffered symbols, $r_k^P$, using the one or more derotation phases, $\theta_k^P$, and storing one or more of the derotated symbols, $t_k^P$, back in the buffer; and
 a controller for directing the system to perform one or more iterations.

2. The system of claim 1 further comprising a delay element for compensating at least in part for delay through the serial turbo decoder and the tracking loop module.

3. The system of claim 1 wherein the serial turbo decoder comprises a series combination of a inner SISO, a de-interleaver, an output SISO, and an interleaver, wherein the inner SISO has an a priori input coupled to the output of the interleaver.

4. The system of claim 3 wherein the inner and outer SISOs are soft output decoders.

5. The system of claim 4 wherein the decoders are log-MAP decoders.

6. The system of claim 3 wherein the symbol estimates are provided by the inner SISO of the serial turbo decoder.

7. The system of claim 3 wherein the symbol estimates are derived from the output of the interleaver of the serial turbo decoder.

8. The system of claim 7 wherein the symbol estimates are derived by passing the output of the interleaver through an encoder and channel symbol mapper that is configured to generate a code that the inner SISO is capable of decoding.

9. The system of claim 1 wherein one or more of the buffered symbols $r_k^P$ are derotated only during selected iterations.

10. The system of claim 1 wherein one or more of the buffered symbols $r_k^P$ are derotated after a prescribed number of iterations.

11. The system of claim 1 wherein one or more of the buffered symbols $r_k^P$ are derotated only during an initial number of iterations.

12. The system of claim 1 wherein the tracking loop module is configured to determine one or more of the derotation phases $\theta_i^P$ in accordance with the following equation:

$$\theta_i^P = \sum_{j=i-W/2}^{j=i+W/2} z_j^P \cdot w_j$$

where $$\sum_{j=i-W/2}^{j=i+W/2} w_j = 1,$$

W is the size of a window, in terms of number of symbols; $z_j^P$ is a residual derived from a comparison of a buffered symbol $r_j^P$ with a corresponding estimate of that symbol $s_j^P$; and $w_j$ is the weight assigned to the jth residual $z_j^P$.

13. The system of claim 12 wherein the weights $w_j$ follow a time-domain description of a predefined phase-noise mask.

14. The system of claim 1 wherein the tracking loop module is configured to determine one or more of the derotation phases $\theta_i^P$ in accordance with the following expression:

$$\theta_i^P = \frac{\sum_{j=i-W/2}^{j=i+W/2} z_j^P \cdot w_j \cdot R_j^P}{\sum_{j=i-W/2}^{j=i+W/2} w_j \cdot R_j^P}$$

where W is the size of a window, in terms of number of symbols; $z_j^P$ is a residual derived from a comparison of a buffered symbol $r_j^P$ with a corresponding estimate of the symbol $s_j^P$; $w_j$ is the weight assigned to the jth residual $z_j^P$; and $R_j^P$ is a reliability metric for a symbol estimate $s_j^P$.

15. The system of claim 1 wherein the tracking loop module is configured to determine one or more derotation phases $\theta_k^P$ in accordance with the following equation:

$$\theta_k^p = \sum_{i=1}^{N} a_i \cdot \theta_{k-i}^p + \sum_{i=0}^{M-1} b_i \cdot R_{k-i}^p \cdot z_{k-i}^p$$

where $\theta_k^p$ is the derotation phase for the kth symbol during the pth iteration, $\theta_{k-i}^p$ represents the derotation phase for the (k−i)th symbol during the pth iteration, $a_i$ is a coefficient applied to $\theta_{k-i}^p$, $z_{k-i}^p$ is a residual derived from a comparison of a symbol $r_{k-i}^p$ with an estimate $s_{k-i}^p$ of that symbol, $R_{k-i}^p$ is the reliability metric for the estimate of the (k−i)th symbol during the pth iteration, $b_i$ is a coefficient applied to $R_{k-i}^p \cdot z_{k-i}^p$, and M and N are non-negative integers.

16. The system of claim 1 wherein one or more residuals $z_k^p$ are phase residuals $e_k^p$.

17. The system of any of claim 1 wherein one or more residuals $z_k^p$ are orthogonal component residuals $y_k^p$ representing the components of $r_k^p$ orthogonal to $S_k^p$.

18. A receiver including the system of claim 1.

19. A communications device including the receiver of claim 18.

20. A set-top box comprising the communications device of claim 19.

21. The system of claim 1 wherein the symbol derotator is a modulator.

22. An iterative carrier phase tracking decoding system comprising:
buffer means for buffering a block of symbols;
serial turbo decoding means for providing, during an iteration p, one or more estimates $s_k^P$ of one or more of the buffered symbols $r_k^P$, and having a capability to provide one or more reliability metrics $R_k^P$, for the one or more estimates, and, after a prescribed number of iterations, estimates of underlying source bits;
tracking loop means for, during an iteration p, (a) determining one or more residuals $z_k^P$ between one or more of the buffered symbols, $r_k^P$ and one or more corresponding symbol estimates, $s_k^P$; (b) weighting the one or more residuals with one or more corresponding reliability metrics, $R_k^P$; and (c) determining one or more derotation phases $\theta_k^P$, responsive to one or more of the weighted or unweighted residuals;
symbol derotation means for derotating, during an iteration p, one or more of the buffered symbols, $r_k^P$, using one or more derotation phases, $\theta_k^P$, and storing one or more derotated symbols, $t_k^P$, back in the buffer; and
control means for directing the system to perform one or more iterations.

23. A method of performing iterative decoding, comprising the following steps:
providing one or more estimates $s_k^P$ of a block of buffered symbols $r_k^P$;
providing one or more reliability metrics $R_k^P$ for corresponding one or more estimates;
determining one or more residuals $z_k^P$ between one or more buffered symbols $r_k^P$ and one or more symbol estimates $s_k^P$;
weighting one or more residuals $z_k^P$ with one or more reliability metrics $R_k^P$; determining one or more derotation phases $\theta_k^P$ responsive to one or more of the weighted or unweighted residuals;
derotating one or more buffered symbols $r_k^P$ using one or more derotation phases $\theta_k^P$; buffering one or more derotated symbols $t_k^P$;
if a prescribed number of iterations has not been completed, performing another iteration beginning with the first providing step; and
after a prescribed number of iterations has been completed, providing estimates of underlying source bits.

24. The method of claim 23 further comprising derotating one or more buffered symbols $r_k^P$ only during selected iterations.

25. The method of claim 23 further comprising derotating one or more buffered symbols $r_k^P$ after a prescribed number of iterations.

26. The method of claim 23 further comprising derotating one or more buffered symbols $r_k^P$ only during an initial number of iterations.

27. The method of claim 23 further comprising determining one or more derotation phases $\theta_i^P$ in accordance with the following equation:

$$\sum_{j=i-W/2}^{j=i+W/2} w_j = 1,$$

where $$\theta_i^p = \sum_{j=i-W/2}^{j=i+W/2} z_j^p \cdot w_j$$

W is the size of a window, in terms of number of symbols; $z_j^P$ is a residual derived from a comparison of a buffered symbol $r_j^P$ with a corresponding estimate of that symbol $s_j^P$; and $w_j$ is the weight assigned to the jth residual $z_j^P$.

28. The method of claim 27 wherein the weights $w_j$ follow a time-domain description of a predefined phase-noise mask.

29. The method of claim 23 further comprising determining one or more derotation phases $\theta_i^P$ in accordance with the following expression:

$$\theta_i^p = \frac{\sum_{j=i-W/2}^{j=i+W/2} z_j^p \cdot w_j \cdot R_j^p}{\sum_{j=i-W/2}^{j=i+W/2} w_j \cdot R_j^p}$$

where W is the size of a window, in terms of number of symbols; $z_j^P$ is a residual derived from a comparison of a buffered symbol $r_j^P$ with a corresponding estimate of that symbol $s_j^P$; $w_j$ is the weight assigned to the jth residual $z_j^P$; and $R_j^P$ is a reliability metric for the symbol estimate $s_j^P$.

30. The method of claim 23 further comprising determining one or more derotation phases $\theta_k^P$ in accordance with the following equation:

$$\theta_k^p = \sum_{i=1}^{N} a_i \cdot \theta_{k-i}^p + \sum_{i=0}^{M-1} b_i \cdot R_{k-i}^p \cdot z_{k-i}^p$$

where $\theta_k^P$ is the derotation phase for the kth symbol determined during the pth iteration, $\theta_{k-i}^P$ represents the derotation phase for the (k−i)th symbol during the pth iteration, $a_i$ is a coefficient applied to $\theta_{k-i}^P$, $Z_{k-i}^P$ is a residual derived from a comparison of a symbol $r_{k-i}^P$ with an estimate $s_{k-i}^P$ of that symbol, $R_{k-i}^P$ is the reliability metric for the estimate of the (k−i)th symbol during the pth iteration, $b_i$ is a coefficient applied to $R_{k-i}^P \cdot z_{k-i}^P$, and M and N are non-negative integers.

31. The method of claim 23 wherein one or more residuals $z_k^P$ are phase residuals $e_k^P$.

32. The method of claim 23 wherein one or more residuals $z_k^P$ are orthogonal component residuals $y_k^P$ representing the components of one or more of the buffered symbols $r_k^P$ orthogonal to corresponding one or more estimates $s_k^P$.

33. A computer readable medium tangibly embodying the steps of any of the methods of claims 23–32.

34. The medium of claim 33 which is a memory.

35. Circuitry embodying the steps of any of the methods of claims 23–32.

36. The circuitry of claim 35 in a decoder.

37. A synthesized logic circuit which comprises the circuitry of claim 36.

38. An integrated circuit which comprises the circuitry of claim 36.

39. A method of performing iterative decoding, comprising the following steps:

- a step of providing one or more estimates $s_k^P$ of one or more buffered symbols $r_k^P$;
- a step of providing one or more reliability metrics $R_k^P$ for one or more estimates;
- a step of determining one or more residuals $z_k^P$ between one or more buffered symbols $r_k^P$ and corresponding one or more symbol estimates $s_k^P$;
- a step of weighting one or more residuals $z_k^P$ with one or more corresponding reliability metrics $R_k^P$;
- a step of determining one or more derotation phases $\theta_k^P$ responsive to one or more of the weighted or unweighted residuals;
- a step of derotating one or more buffered symbols $r_k^P$ using one or more derotation phases $\theta_k^P$;
- a step of buffering one or more derotated symbols $t_k^P$;
- if a prescribed number of iterations has not been completed, a step of performing another iteration beginning with the first providing step; and
- after a prescribed number of iterations has been completed, a step of providing estimates of underlying source bits.

* * * * *